United States Patent Office 2,791,599
Patented May 7, 1957

2,791,599

O,O'-DIALKYL S(ALKYL SULFOXYETHYL) PHOSPHOROTHIOLATES AS PESTICIDES

David William John Lane, Cambridge, and Dennis Frederick Heath, Hauxton, England, assignors to Pest Control Limited, Bourn, England, a British company No Drawing. Application December 24, 1953, Serial No. 400,364

Claims priority, application Great Britain December 31, 1952

9 Claims. (Cl. 260—461)

This invention relates to a new class of organic derivatives of thiophosphoric acid, their manufacture and use.

The invention provides new chemical compounds being sulphoxides of the general formula:

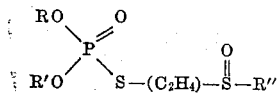

where R, R' and R" are each an alkyl group containing not more than four carbon atoms. Preferably R, R' and R" in the general formula each contain not more than three carbon atoms.

The new compounds have systemic pesticidal properties and the invention, therefore, also provides new pesticides consisting of or containing a new compound as defined above and, if desired, also a solid or liquid diluent or solvent.

The new compounds are miscible with water in all proportions and are reasonably stable in it. The preferred diluent is therefore water. Useful spray concentrations may contain e. g. between 0.01 and 0.5% active ingredient. Stock solutions for storage may, of course, contain any desired amount of active ingredient. It is desirable to add a wetting agent in order to ensure that the pesticidal solution spreads evenly on the plant leaves.

Suitable wetting agents which may be used alone or in combination are:

"Lissapol NX," a product of Imperial Chemical Industries Limited containing an alkylated phenol-polyethylene oxide condensate;

"Triton X–100," a product of Röhm & Haas containing isooctylphenol-polyethylene oxide condensate;

"Alcopol O," a product of Allied Colloids containing di-octyl sodium sulphosuccinate.

The proportion of wetting agent to active ingredient in such compositions may vary within wide limits and may be in some cases as high as 1:1.

Liquid formulations may also be made with organic solvents, such as acetone, benzene, chlorinated hydrocarbons and alcohol, and may contain an emulsifier. Fumigants, such as ethylene dibromide or 1.2-dichloropropane, may also be used as constituents of such liquid formulations.

Solid mixtures may be made by allowing the active ingredient to be adsorbed on inert finely divided mineral or cellulosic materials, such as china clay, fuller's earth, bentonite, talc powder and wood flour.

The new compounds have advantages as pesticides over the corresponding compounds

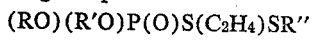

from which they may be prepared as described below. The new compounds have no smell; they have a lower vapour pressure, so that there is less danger from their vapour and less is lost by evaporation when they are applied to plants; they are soluble in water, which facilitates the preparation of pesticide compositions.

The following are examples of the new compounds:

*Compound A.*—This is O,O-diethyl-S-(ethylsulphinyl)-ethyl thiophosphate,

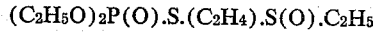

This compound is a colourless oil which has the following physical properties:

Density $D_{25° C.}^{25° C.} = 1.2160 \pm 0.0003$.
Refractive index $n = 1.5038$, 18° C., sodium D line.
Solubility: Miscible with water in all proportions, and with toluene, benzene, chloroform and alcohol.
Hydrolysis rate in N/100 sodium hydroxide = 3.34 (OH$^-$) min.$^{-1}$ at 25° C.
Partition ratios between Sörensen phosphate buffer, pH 7.17, and two solvents with Compound A in very dilute solution:
  Aqueous/benzene = $5.83 \pm 0.2$ at 18° C.
  Aqueous/trichloroethylene = $2.19 \pm 0.05$ at 18° C.
Partition ratio between chloroform and water: Chloroform/water = $41.6 \pm 1.5$ at 16° C.
Hydrolysis rate in water at very great dilution = $3.9 \times 10^{-3}$ min.$^{-1}$ at 100° C.

*Compound B.*—This is O,O-dimethyl-S-(methylsulphinyl)-ethyl thiophosphate,

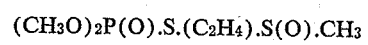

It is a pale brown liquid of the following physical properties:

Hydrolysis rate in alkaline solution = $23 \pm 3$ (OH$^-$) min.$^{-1}$ at 25.4° C.
Partition ratio $$\frac{CHCl_3}{water} = 1.25 \pm 0.05 \text{ at } 18° C.$$

Miscible with water and chloroform in all proportions.

*Compound C.*—This is O,O-dimethyl-S-(ethylsulphinyl)-ethyl thiophosphate,

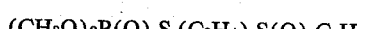

It is a pale brown liquid of the following physical properties:

Partition ratio

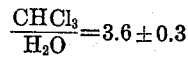

Hydrolysis rate in alkaline solution = 20 (OH$^-$) min.$^{-1}$ at 25.4° C.
Miscible with water and chloroform in all proportions.

The reasons for assigning the above formulae to the new compounds are discussed further below.

According to the invention the new compounds are produced from thioethers (RO)(R'O)P(O)S(C$_2$H$_4$)SR", where R, R' and R" have the above-defined meanings, by oxidising these compounds with aqueous hydrogen peroxide under neutral conditions at not more than moderately elevated temperature. The reaction may be carried out with or without a solvent, which may be water or any solvent with which hydrogen peroxide does not react appreciably but which will dissolve it when it is added in aqueous solution. We have found that the reaction proceeds smoothly and with yields up to 97% of the theoretical even when using only the theoretical amount or a very small excess of hydrogen peroxide. The concentrations and proportions of hydrogen peroxide in the reaction mixture and the reaction temperatures may be varied over a wide range, having regard, however, to the instability of hydrogen peroxide on heating and to the increase in reaction speed with rising concentrations of hydrogen peroxide; with concentrated hydrogen peroxide the reaction becomes violent and uncontrollable when the reactants are present in more than minute quantities.

In carrying out the oxidation the following should be borne in mind:

(a) The hydrogen peroxide cannot be too dilute or the temperature too low, except that at low temperatures and high dilutions the reaction is very slow;

(b) Up to 100 vol. hydrogen peroxide may be used, but care must be taken or the reaction gets out of hand;

(c) A considerable excess even of 100 vol. hydrogen peroxide can be used providing the reaction is stopped by cooling as soon as the temperature no longer rises on removing the cooling bath, and the maximum temperature does not exceed about 85° C.;

(d) If any of the new compounds are heated to 100° C. for five minutes with an equal volume of 100 vol. hydrogen peroxide, further reaction takes place, leading to a mixture of further oxidation products;

(e) If one gm. $(C_2H_5O)_2P(O)S(C_2H_4)SC_2H_5$ is heated to 100° C. with 1.5 ml. or more of hydrogen peroxide 100 vol. for five minutes at 100° C., the main product of reaction is not Compound A but a mixture of further oxidation products.

The following examples will illustrate the production of the new compounds. In order easily to estimate the yield, we used as starting material a compound $$(RO)(R'O)P(O)S(C_2H_4)SR''$$

containing $^{32}P$, the radio-active isotope of phosphorus, which allowed us to determine the partition between various pairs of solvents of the product obtained by measuring the radio activity:

EXAMPLE 1

100 mls. of a 0.212% solution of

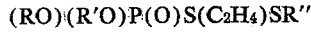

in water were mixed with 20 mls. of 8 vol. hydrogen peroxide (twenty times the theoretical quantity) in water and thermostated at 25.4° C. Aliquots were extracted and analysed for the desired product at the stated intervals by the method given above.

Fraction of starting material converted to Compound A:

| | |
|---|---|
| 30 mins | 0.47 |
| 60 mins | 0.69 |
| 3 hours | 0.95 |

EXAMPLE 2

1.13 gm. of the same starting material as in Example 1 and 1.0 ml. of 50 vol. hydrogen peroxide, a theoretically equimolar mixture, were warmed with agitation to 60–70° C. The reaction, which is exothermic, then became rapid enough to maintain the temperature at 70° C. for three minutes, after which the mixture cooled.

Analysis of product:

| | Percent |
|---|---|
| Compound A | 93.5 |
| Starting material | 6 |
| Ionic compounds | 0.5 |

EXAMPLE 3

11 gm. of the same starting material as in Example 1 were stirred on a water bath at 70° C. and 20 ml. of 50 vol. hydrogen peroxide (about 100% excess over the theoretical quantity) were added steadily over five minutes. The product was cooled.

| | Percent |
|---|---|
| Compound A | 97 |
| Starting material | 2 |
| Ionic products | 1 |

EXAMPLE 4

1.13 gm. of the same starting material as in Example 1 were warmed to 60–70° C. with 1 ml. of 100 vol. hydrogen peroxide (about 100% excess over the theoretical quantity). The reaction then proceeded violently, giving a 97% yield of Compound A. The reaction seemed too uncontrollable to be repeated except on a very small scale.

The product obtained in all the foregoing examples could be reduced to the starting product by treating its solution in 30% acetic acid with zinc dust for several hours.

EXAMPLE 5

To 4 gm. of $(CH_3O)_2P(O)S(C_2H_4)SC_2H_5$ in a small flask 4 ml. of 100 vol. hydrogen peroxide were added drop-wise until the temperature rose. The mixture was cooled to maintain the temperature at 70–80° C. until reaction was complete. The mixture was then diluted with water and washed with benzene once, extracted with chloroform six times and chloroform removed by evaporation under suction.

Yield, by radiotracer assay, 91% of Compound C.

Product—pale brown liquid, still containing a trace of solvent, decomposed by vacuum distillation or molecular distillation at 100° C.

Properties:

Partition ratio $$\frac{CHCl_3}{H_2O} = 3.6 \pm 0.3$$

Hydrolysis rate in alkaline solution = 20 (OH$^-$) min.$^{-1}$ at 25.4° C.

Miscible with water and chloroform in all proportions.

EXAMPLE 6

Example 5 was repeated, but using 4 gm. of $$(CH_3O)_2P(O)S(C_2H_4)SCH_3$$

as starting material.

Yield: 90% of Compound B.

Product: Pale brown liquid, still containing some solvent. Decomposed by vacuum distillation or molecular distillation at 100° C.

Properties:

Hydrolysis rate in alkaline solution = 23 ± 3 (OH$^-$) min.$^{-1}$ at 25.4° C.

Partition ratio $$\frac{CHCl_3}{water} = 1.25 \pm 0.05 \text{ at } 18° C.$$

Miscible with water and chloroform in all proportions.

The constitution of Compound A was deduced from the following experimental procedures and theoretical considerations:

The reaction mixture from Example 3 was diluted with water, the diluted solution extracted with chloroform and the chloroform removed by evaporation under vacuum. The product was a colourless oily liquid, which decomposed on attempted fractionation, but distilled slowly in a molecular still under 0.05 mm. Hg pressure with a liquid temperature of 100° C.

The product seemed to be homogeneous and to consist only of one compound. This has been shown in the following ways, using Compound A derived from radioactive $^{32}PCl_3$ (phosphorus trichloride containing the radioactive isotope of phosphorus, $^{32}P$).

1. A partition chromatographic column was prepared from 20 gm. kieselguhr ("Hyflo-Supercel"), 14 gm. of water (static phase) and benzene (eluting phase). A few gms. of the product were placed on the top of the column, which was eluted with benzene. The eluent fractions were assayed for radio-active phosphorus. More than 99.5% of the phosphorus placed on the column appeared in one narrow band.

2. Successive extraction of a very dilute aqueous solution of Compound A with trichloroethylene, and of a trichloroethylene solution with water (the procedure described by D. F. Heath, D. W. J. Lane and Margaret Llewellyn, Journal Science of Food and Agriculture, 3, 68 (1952), "Studies on Commercial Octamethylpyrophosphoramide, Part IV") revealed no changes in partition ratio as the extraction proceeded. This procedure is the equivalent of countercurrent extraction, a well-known method of separation.

3. The rate constant for the hydrolysis rate of a sample of Compound A in a large excess of very dilute alkali showed no "drift" as hydrolysis proceeded until at least 80% of the compound was hydrolysed. Beyond this deviations do not exceed the experimental error.

The interpretation of these three points is that either Compound A is a mixture of compounds which cannot be separated by partition chromatography using very different eluting solvents (benzene and trichloroethylene) and which have very similar hydrolysis rates in alkaline solution, or Compound A is one pure compound. The latter is much more probable.

Compound A can be prepared in good yield by the action of very dilute hydrogen peroxide on $$(C_2H_5O)_2POS(C_2H_4)SC_2H_5 \quad (I)$$

in neutral solution. It is general chemical knowledge that under these conditions C—C—H systems are not attacked, but that C—S—C systems may be, with the formation of a sulphoxide or sulphone. Only one mol. of hydrogen peroxide is required to form one mol. of Compound A from one mol. of (I), therefore the compound is a sulphoxide. It is, therefore, one of the two compounds:

$$(C_2H_5O)_2P(O).S.(C_2H_4).S(O).C_2H_5 \quad (II)$$
$$(C_2H_5O)_2P(O).S(O).(C_2H_4).S.C_2H_5 \quad (III)$$

There are good theoretical grounds for preferring (II) to (III).

Thus, the hydrolysis rate in alkalies is 3.34 (OH−) min.−1 against 0.81 (OH−) min.−1 for (I). The rates are, therefore, similar. It has been shown by a number of workers that the substitution on the phosphorus of one group by a more electrophilic group greatly increases the rate of alkaline hydrolysis, e. g. the substitution of one $C_2H_5O$— for one $(CH_3)_2N$— in $[(CH_3)_2N]_4P_2O_3$ increases the alkaline hydrolysis rate several hundredfold; as does the substitution of —F for —O—$C_6H_4$—$NO_2$ in

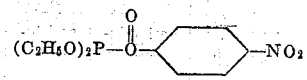

The substitution of —$SOC_2H_4SC_2H_5$ for $SC_2H_4SC_2H_5$ in (I) is a substitution of the same type. The change in the hydrolysis rate seems, therefore, too slight to be consistent with Compound A being (III), but is consistent with (II), when the effect of the central —SO— group would be much reduced by the intervening carbon chain.

In confirmation of this reasoning, drastic oxidation of Compound A with a large excess of hydrogen peroxide at 100° C. yields a compound which gives an infra-red spectrum consistent with a central structure $$>P(O)—SO_2—C$$

This compound is over one hundred times less stable than (I) to alkaline hydrolysis. Thus a neighbouring highly electrophilic group in this system confers the expected instability to dilute alkalies.

Secondly, (I) is very sparingly soluble in water. This low solubility is presumably due to the long hydrophobic —S—$C_2H_4SC_2H_5$ chain. It is unlikely that oxidation of the sulphur adjacent to the phosphorus would produce a compound which is miscible with water in all proportions as is Compound A, as the length of the inert chain is only reduced by one unit in this way. If, however, the centre sulphur is oxidised to a hydrophilic —SO— group then the observed change in solubility is to be expected.

The compound is, therefore, believed to be (II).

Similar considerations in the case of Compounds B and C lead to the conclusion that the new compounds of the invention have the constitution $$(RO)(R'O)P(O).S.(C_2H_4).S(O).R''$$

The new compounds are potent systemic insecticides, that is to say are readily absorbed into the sap stream of the living plant by the leaves and transported inside the plant with the sap.

Chrysanthemum leaves, weighing between 100 mgm. and 200 mgm. each, and infested on the lower surface with *Coloradoa rufomaculata* were treated with 0.1 ml. of a 0.1% solution of Compound A, which was applied to the upper surface from a pipette. The leaves were then dried and put into Petri dishes on moist filter papers. After twenty-four hours, 36.9% of the aphids present were dead. The temperature was 20° C.

In another test, lengths of chive leaf, 1 inch long, were filled with 0.1 ml. of a 0.01% solution of Compound A and sealed with wax at both ends. Seventeen hours after treatment the leaves were put into 2″ x ¼″ glass tubes and infested with *Myzus ascalonicus*, the shallot aphid. The temperature was 20° C. After 4½ hours, 27.7% of the aphids were dead and after seven hours 61.1%.

In the following tables a comparison is made of the biological action of the new Compounds A, B and C of the invention and the known compound (I) from which A is prepared:

Table I

Field bean seedlings, 2–3″ high, with two to three bifoliate leaves, were treated either by spraying with insecticide solutions or by pouring 10 ml. solution on to the soil. The plants were infested, at intervals after spraying, with *Acyrthosiphon pisum* and *Megoura viciae*. Three replicate plants for each treatment, 50 to 100 insects for each treatment.

PLANTS SPRAYED

| Insects | Period of exposure of insects on treated plants, hours | Concentration, percent active ingredient | Interval between spraying and infesting | Percentage Mortalities | | | |
|---|---|---|---|---|---|---|---|
| | | | | (I) | A | B | C |
| Acyrthosiphon pisum | 24 | 0.1 | 3 hrs | 100.0 | 100.0 | 100.0 | 100.0 |
| | | 0.1 | 5 days | 85.8 | 100.0 | 98.4 | 98.3 |
| | | 0.05 | 3 hrs | 100.0 | 100.0 | 100.0 | 100.0 |
| | | 0.05 | 5 days | 83.3 | 89.8 | 100.0 | 94.5 |
| Do | 48 | 0.1 | 5 days | 98.8 | 100.0 | 100.0 | 100.0 |
| | | 0.05 | 5 days | 93.3 | 100.0 | 100.0 | 100.0 |
| Megoura viciae | 24 | 0.1 | 3 hrs | 100.0 | 100.0 | 100.0 | 100.0 |
| | | 0.1 | 1 day | 100.0 | 100.0 | 99.0 | 100.0 |
| | | 0.1 | 5 days | 87.6 | 96.0 | 97.2 | 98.2 |
| | | 0.05 | 3 hrs | 100.0 | 100.0 | 100.0 | 100.0 |
| | | 0.05 | 1 day | 100.0 | 98.3 | 100.0 | 100.0 |
| | | 0.05 | 5 days | 63.0 | 96.1 | 96.7 | 98.0 |
| Do | 48 | 0.1 | 5 days | 98.0 | 98.0 | 100.0 | 100.0 |
| | | 0.05 | 5 days | 87.0 | 100.0 | 100.0 | 100.0 |

PLANTS TREATED ON SOIL

| Insects | Period of exposure of insects on treated plants, hours | Concentration, percent active ingredient | Interval between treating and infesting, days | Percentage Mortalities | | | |
|---|---|---|---|---|---|---|---|
| | | | | (I) | A | B | C |
| Acyrthosiphon pisum | 24 | 0.02 | 1 | 91.1 | 28.7 | 73.8 | 57.7 |
| | | | 3 | 79.1 | 66.7 | 85.5 | 60.7 |
| Do | 48 | 0.02 | 1 | 97.8 | 91.9 | 96.7 | 98.4 |
| Megoura viciae | 24 | 0.02 | 1 | 100.0 | 79.6 | 81.5 | 77.8 |
| | | | 3 | 93.4 | 82.3 | 84.2 | 68.3 |
| Do | 48 | 0.02 | 1 | 100.0 | 100.0 | 96.8 | 100.0 |

Table 2

COMPOUNDS (I), A, B AND C AGAINST PEA APHIS

Sugar Pea seedlings, 2–3 inches high, were treated by pouring 10 ml. solution on to the soil. The plants were infested at intervals after treatment with *Acyrthosiphon pisum*. Four replications for each treatment with (I) and eight replications each for the other treatments. About 25 insects on each plant.

| Time of exposure of insects on treated plants | Concentration, percent active ingredient | Interval between treating and infesting, days | Percentage Mortalities | | | | Water |
|---|---|---|---|---|---|---|---|
| | | | (I) | A | B | C | |
| 24 hrs | 0.02 | 1 | 66.2 | 63.0 | 82.3 | 75.5 | 2.2 |
| | | 6 | 66.3 | 62.1 | 71.0 | 54.5 | 3.5 |
| | | 8 | 36.0 | 42.8 | 58.9 | 45.5 | 9.2 |
| | | 13 | 31.8 | 28.9 | 38.9 | 17.4 | 5.5 |
| 48 hrs | 0.02 | 1 | 90.6 | 94.4 | 92.5 | 98.5 | 9.2 |
| | | 6 | 84.8 | 77.8 | 87.0 | 72.1 | 10.5 |
| | | 8 | 80.8 | 78.7 | 86.0 | 73.4 | 16.8 |
| | | 13 | 64.6 | 59.0 | 65.5 | 28.5 | 10.9 |

Table 3

COMPOUNDS (I), A, B AND C AGAINST RED SPIDER

*Capsicum annuum* plants, with six to eight leaves, and French bean seedlings, with two leaves, were treated either: (a) by spraying, or (b) by pouring 10 ml. solution onto the soil. The plants were infested after treatment with *Tetranychus telarius* confined in glass rings waxed on to the leaves. Two replications (20 mites) for each treatment with French beans, and one replication (10 mites) with Capsicum.

| Plants | Treatment | Time of exposure of mites on plants, hours | Concentration, percent active ingredient | Interval between treating and infesting | Percentage Mortalities | | | | Water |
|---|---|---|---|---|---|---|---|---|---|
| | | | | | (I) | A | B | C | |
| Capsicum annuum | Spray | 24 | 0.1 | 6 hrs | 100.0 | 100.0 | 100.0 | 100.0 | 0 |
| | | | | 3 days | 100.0 | 100.0 | 100.0 | 80.0 | 0 |
| | Soil treatment | 24 | 0.02 | 1 day | 22.2 | 20.0 | 10.0 | 27.3 | 0 |
| French bean | Spray | 24 | 0.1 | 6 hrs | 100.0 | 100.0 | 100.0 | 95.0 | 0 |
| | | | | 3 days | 70.0 | 100.0 | 100.0 | 90.0 | 0 |
| | Soil treatment | 24 | 0.02 | 1 day | 29.4 | 16.6 | 31.2 | 29.4 | 5.6 |
| | Spray | 24 | 0.1 | 1 day | 100.0 | 100.0 | 100.0 | 100.0 | 0 |
| | do | 24 | 0.05 | 1 day | 90.0 | 95.0 | 100.0 | 95.0 | |
| Capsicum annuum | Spray | 48 | 0.1 | 3 days | 100.0 | 100.0 | 100.0 | 100.0 | 0 |
| | Soil treatment | 48 | 0.02 | 1 day | 55.6 | 80.0 | 60.0 | 81.8 | 25.0 |
| French bean | Spray | 48 | 0.1 | 3 days | 100.0 | 100.0 | 100.0 | 100.0 | 0 |
| | Soil treatment | 48 | 0.02 | 1 day | 52.9 | 50.0 | 81.2 | 70.6 | 22.2 |

REMARKS

The compounds tested are all soluble in water except compound (I). Solutions were made up as follows:

0.2 ml. insecticide were dissolved in 50 ml. of acetone and the solution was made up to 100 ml. with a solution of 0.05% of an emulsifier in distilled water. Further dilutions were made where necessary with the 0.05% emulsifier solution.

The tables show new Compounds A, B and C to be excellent persistent systemic insecticides against aphids and red spiders. They show further that the new compounds, although similar in some respects to the known compound (I), differ from it in their biological behaviour by giving better results as sprays.

The three new compounds are biologically hardly distinguishable from each other.

What we claim is:

1. New chemical compounds being sulphoxides of the general formula:

$$\begin{array}{c} RO \\ \diagdown \\ R'O \end{array} \!\!\! P \!\!\! \begin{array}{c} O \\ \diagup \\ \diagdown \\ S-(C_2H_4)-\overset{O}{\underset{\|}{S}}-R'' \end{array}$$

where R, R' and R" are each an alkyl group containing not more than four carbon atoms.

2. New chemical compounds according to claim 1, where R, R' and R" in the general formula are each an alkyl group containing not more than three carbon atoms.

3. Pesticides containing a new chemical compound of the general formula:

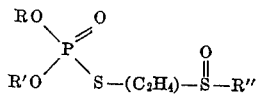

where R, R' and R" are each an alkyl group containing not more than four carbon atoms.

4. Pesticides according to claim 1, where R, R' and R" in the general formula are each an alkyl group containing not more than three carbon atoms.

5. As a new chemical compound: O,O-diethyl-S-(ethylsulphinyl)-ethyl thiophosphate,

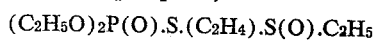

6. As a new chemical compound: O,O-dimethyl-S-(methylsulphinyl)-ethyl thiophosphate,

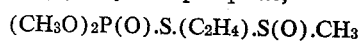

7. As a new chemical compound: O,O-dimethyl-S-(ethylsulphinyl)-ethyl thiophosphate,

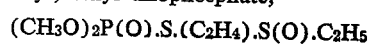

8. A process for the production of sulphoxides, wherein a compound of the general formula:

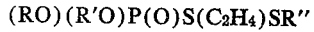

where R, R' and R" are each an alkyl group containing not more than four carbon atoms, is treated under neutral conditions with aqueous hydrogen peroxide at not more than moderately elevated temperature to cause an oxygen atom to be added to a sulphur atom of the said compound.

9. A process according to claim 8, where R, R' and R" in the general formula are each an alkyl group containing not more than three carbon atoms.

References Cited in the file of this patent

UNITED STATES PATENTS

| | | |
|---|---|---|
| 2,140,608 | Ufer | Dec. 20, 1938 |
| 2,560,049 | Cook | July 10, 1951 |
| 2,560,050 | Cook | July 10, 1951 |
| 2,571,989 | Schrader | Oct. 16, 1951 |

FOREIGN PATENTS

| | | |
|---|---|---|
| 871,448 | Germany | Mar. 23, 1953 |